United States Patent [19]

Ughi

[11] 4,244,070

[45] Jan. 13, 1981

[54] SOLE WITH HEEL FOR WOMEN FOOTWEARS OR SHOES, AND METHOD FOR QUICKLY AND ECONOMICALLY MAKING SAID SOLES WITH CORRESPONDING HEELS

[76] Inventor: Edoardo Ughi, via Plinio, 4-Lecco (Como), Italy

[21] Appl. No.: 957,418

[22] Filed: Nov. 2, 1978

[30] Foreign Application Priority Data

Nov. 29, 1977 [IT] Italy .............................. 30159 A/77

[51] Int. Cl.³ ......................... A43D 9/00; A43B 13/28
[52] U.S. Cl. ................................ 12/142 J; 36/24.5; 36/34 A; 264/244
[58] Field of Search ................... 36/34 A, 34 B, 34 R, 36/24.5; 264/244; 12/142 J

[56] References Cited

U.S. PATENT DOCUMENTS

| 2,732,635 | 1/1956 | Frost | 36/24.5 |
| 2,912,771 | 11/1959 | Harrison | 36/24.5 X |
| 2,912,772 | 11/1959 | Harrison | 36/24.5 X |
| 3,225,465 | 12/1965 | Ball | 36/34 A |
| 3,258,861 | 7/1966 | Niconchuk | 36/34 A |
| 3,705,934 | 12/1972 | Giannini | 264/244 |

FOREIGN PATENT DOCUMENTS

| 212341 | 1/1958 | Australia | 36/34 A |
| 883036 | 11/1961 | United Kingdom | 36/24.5 |
| 957621 | 5/1964 | United Kingdom | 36/34 A |
| 1003951 | 9/1965 | United Kingdom | 264/244 |

Primary Examiner—James Kee Chi
Attorney, Agent, or Firm—Bucknam and Archer

[57] ABSTRACT

A sole-heel assembly for women shoes, particularly of the high heel type, made of a plastics material, is described, which is formed of a single piece and is provided, inwardly with respect to the heel, with a reinforcing core having a hole for the fixing of the heel top-piece. A stiffening element is embedded in the sole and extends from the top of the heel as far as the overall front part of the foot-sole. The heel is laterally and rearwardly covered by a thin sheet material. The heel is covered on the front face by a further thin sheet material. The thin sheet material consists of skin, synthetic skin, wood or plastics laminate, and the reinforcing core and stiffening element are made of wood, metal, premolded plastics material or the like. The method of preparation consists of injection molding a thermoplastics material in a mold formed by opposed complementary portions defining therebetween a cavity of the proper shape for the heel and sole, and embedding a reinforcing core and a stiffening element respectively in the heel and sole during the injection step. A thin sheet material for laterally, rearwardly and frontwardly covering the heel is located in the mold at the heel cavity before the injecting of the thermoplastics material.

1 Claim, 4 Drawing Figures

SOLE WITH HEEL FOR WOMEN FOOTWEARS OR SHOES, AND METHOD FOR QUICKLY AND ECONOMICALLY MAKING SAID SOLES WITH CORRESPONDING HEELS

The present invention relates to a sole with heel for women footwears or shoes and to a particular method for quickly and economically making said soles with corresponding heels.

In particular the present invention relates to the making of soles having a high heel, like that generally used in the women shoes.

As it is known, in the women shoes, especially in those provided with a high type of heel, the point which most frequently breaks is that at which the sole is jointed to the heel.

In order to prevent this breaking off, several types of reinforcing members have been proposed but any of them has practically provided satisfactory results.

Therefore, the main object of the present invention is to provide a sole with heel free of the aforesaid drawback.

It is another object of the present invention to provide a method for making a sole with heel which is quick and economic.

The applicant has found that the aforesaid objects are achieved by a sole with heel made in a single piece and of plastics material and provided, inwardly with respect to the heel, with a reinforcing core which lowerly ends with a hole for the fixing of the heel top-piece and embedded in the sole, with a stiffening element extending from the top of the heel to the overall front zone of the sole of the foot.

The reinforcing core, as located in the heel, and the stiffening element embedded in the sole may be made of wood, metal, premolded plastics material or the like.

The method for making the sole with heel, according to the present invention, consists of molding, by injection, the plastics material by using a mold effective to allow for the obtaining, in a single operation, of the proper sole and the high heel rigid therewith. Moreover, the heel is provided, during the making step, with an outer coating effective to completely finish said heel, without requesting finishing subsequent operations.

To this end, the instant making method provides for the introducing, in the mold portion which has to form the heel, before the molding, a thin sheet material portion, suitably shaped to laterally and rearwardly cover the heel.

Said sheet material may consists of skin, synthetic skin, wood or other suitable material.

It is also possible to insert in the mold, before the molding, a further sheet material portion for covering the heel front face.

The thermoplastic material is injected in the mold through a hole located exactly above the heel, in order to press against the mold inner face the aforesaid covering sheets, thereby causing said sheets to perfectly adhere against the inner walls of the mold.

In this manner the fluid thermoplastics material is prevented from outflowing from said covering sheets, by flowing on the outer surface thereof and consequently damaging the aesthetical aspect of the finished heel.

Before introducing said thermoplastics material, in the heel is inserted the stiffening or reinforcing core which lowerly ends with a hole effective to fix the complementary heel top-piece, this latter being made of leather, rubber or like material.

In the mold, at the heel stiffening core hole, it is provided a suitable pin for continuing said hole in the injected material.

Moreover, in the sole, in the forming thereof, the foot-sole, or in general the stiffening element, is included which, as therein-above described, extends from the top of the heel as far as the overall front zone of the foot-sole.

As the plastics material for forming the instant sole-heel assembly, there may be used polyvinyl chloride, ABS resins, polystyrene, polyester resins, polyethylene, polypropylene and the like.

In order to better understand the functional and constructional characteristics of the sole with heel for women shoes according to the present invention and the making method thereof, is provided the following description referring to the accompanying drawing figures, illustrating an exemplificative and not limitative preferred embodiment of the present invention, and were:

Figure 1:
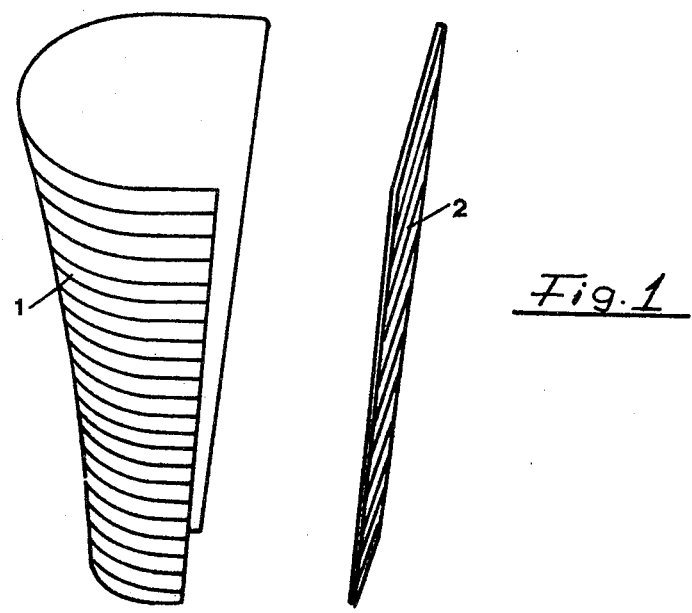
FIG. 1 is a side perspective view of the covering sheets for the heel.
Figure 2:
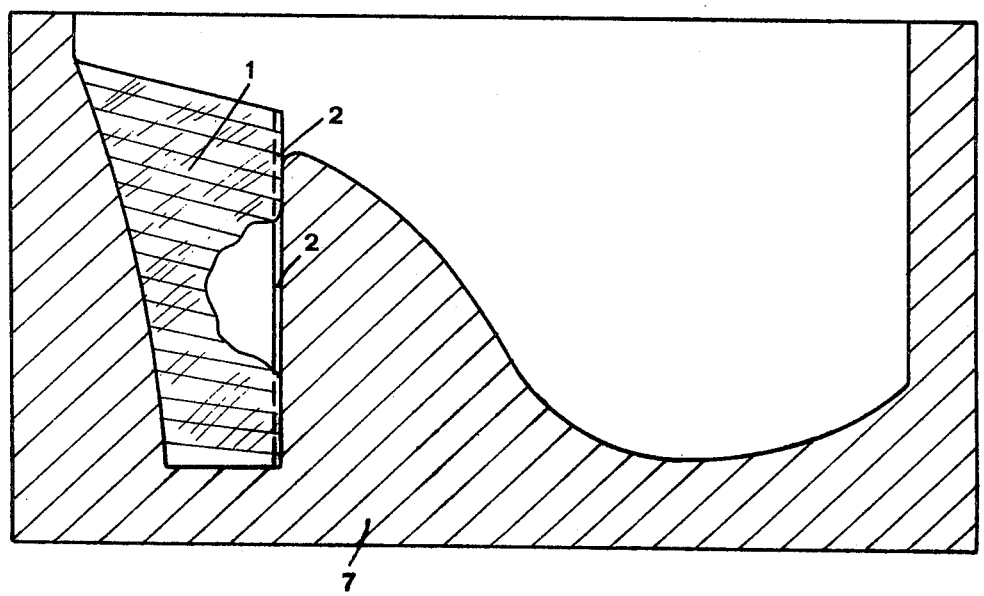
FIG. 2 is a longitudinal cross-section as obtained by a vertical plane through the middle portion of the mold lower portion, thereinto are inserted the two heel covering sheets in a precise contacting relationship with the inner walls of the mold itself.

Referring to the figures of the accompanying drawings, the sole with heel, according to the present invention, is formed by the sole proper (9) and the high heel (9') both made of a plastics material and forming a monolithic structure.

Said sole-heel monolithic structure is reinforced by a reinforcing core (3) located inwardly with respect to the heel (9') and by a stiffening element (4) embedded in the sole (9) and extending from the top of the heel as far as the overall front zone of the foot-sole.

The heel (9') may be laterally and rearwardly covered by a sheet material (1) and, in the inner portion thereof, by a sheet material (2).

Both covering sheets (1) and (2) may be, independently from one another, made of skin, synthetic skin, wood or sheet material, plastic laminate or other like materials.

The instant sole with corresponding heel may be obtained by stamping a single structure in a conventional suitable mold having opposed complementary portions (7) and (8) which, together, define therebetween a hollow or cavity having the desired shape for the heel (9') and sole (9).

The covering sheets (1) and (2), the reinforcing core (3) and the stiffening element (4) are embedded during the injection step.

Figure 3:
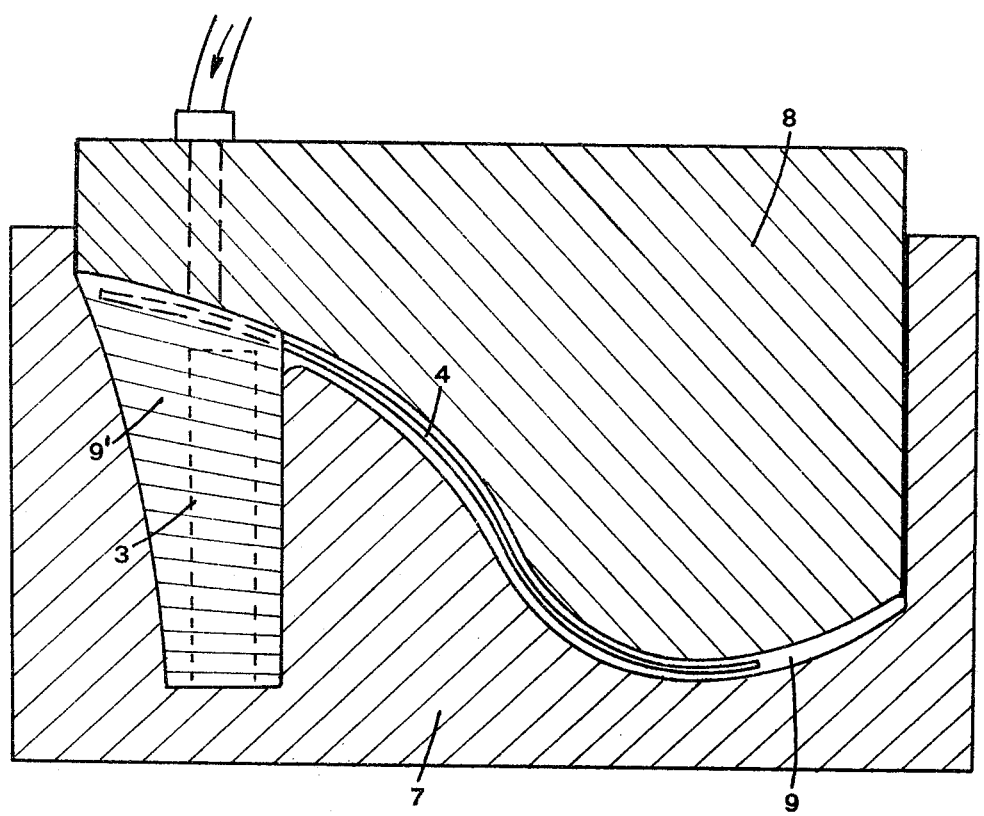
FIG. 3 illustrates that same longitudinal cross-section of the complete mold illustrated in FIG. 2.
Figure 4:
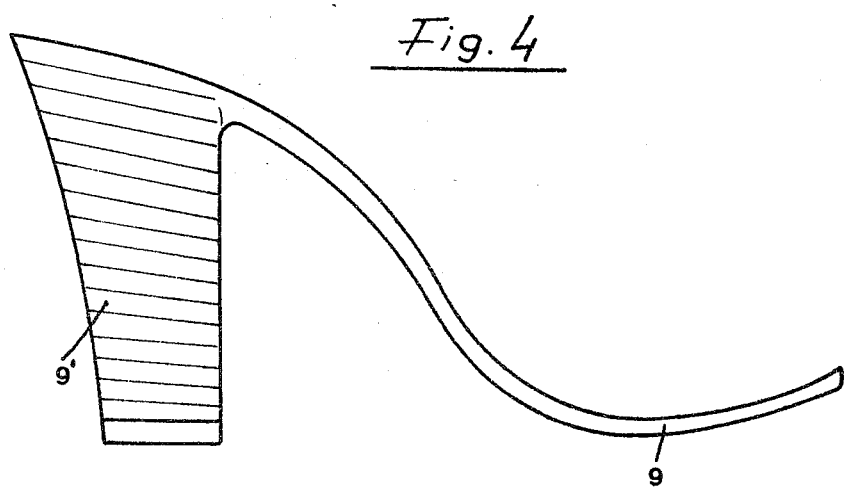
FIG. 4 is a side perspective view of the sole with the corresponding heel according to the present invention.

The thermoplastics material, in molten state, is injected into the cavity defined by the two mold portions (7) and (8), from the upper portion of the heel, as it is illustrated in FIG. 3.

From the above description and the examination of the accompanying drawing figures, the simplicity and cheapness of the method for making the instant sole with corresponding heel and the remarkable economical, practical and functional advantages provided by said sole with heel, especially in the women high heel shoe field, are self-evident.

Obviously, since the present invention has been thereinabove described with reference to an exemplificative embodiment illustrated in the figures of the accompanying drawings, it should be pointed out that in the actual practicing of the invention several variations and modifications of shape, size and construction may be brought about falling within the spirit of the invention itself and without departing from the scope thereof.

I claim:

1. A method of preparing a one-piece sole-heel assembly of the high heel type which consists of the steps of (1) placing a thin sheet material in a mold formed by opposite complementary portions defining therebetween a cavity of the proper shape of the heel and sole, for laterally, rearwardly and frontwardly covering the heel, (2) introducing into the mold a reinforcing core into the heel portion (3) introducing a stiffening element into the sole portion projecting from the top of the heel up to the overall front part of the sole (4) injecting a thermoplastic material into said mold through an opening above the heel portion, pressing said sheet against the mold inner face, whereby said reinforcing core and said stiffening element remain embedded in the heel and sole respectively.

* * * * *